Dec. 13, 1955    R. L. BRUGLER    2,726,518
CASEMENT WINDOW MOUNTED AIR CONDITIONER
Filed April 24, 1953    3 Sheets-Sheet 1

INVENTOR.
Richard L. Brugler
BY
Harness and Harris
ATTORNEYS.

INVENTOR.
Richard L. Brugler.
BY
Harness and Harris
ATTORNEYS.

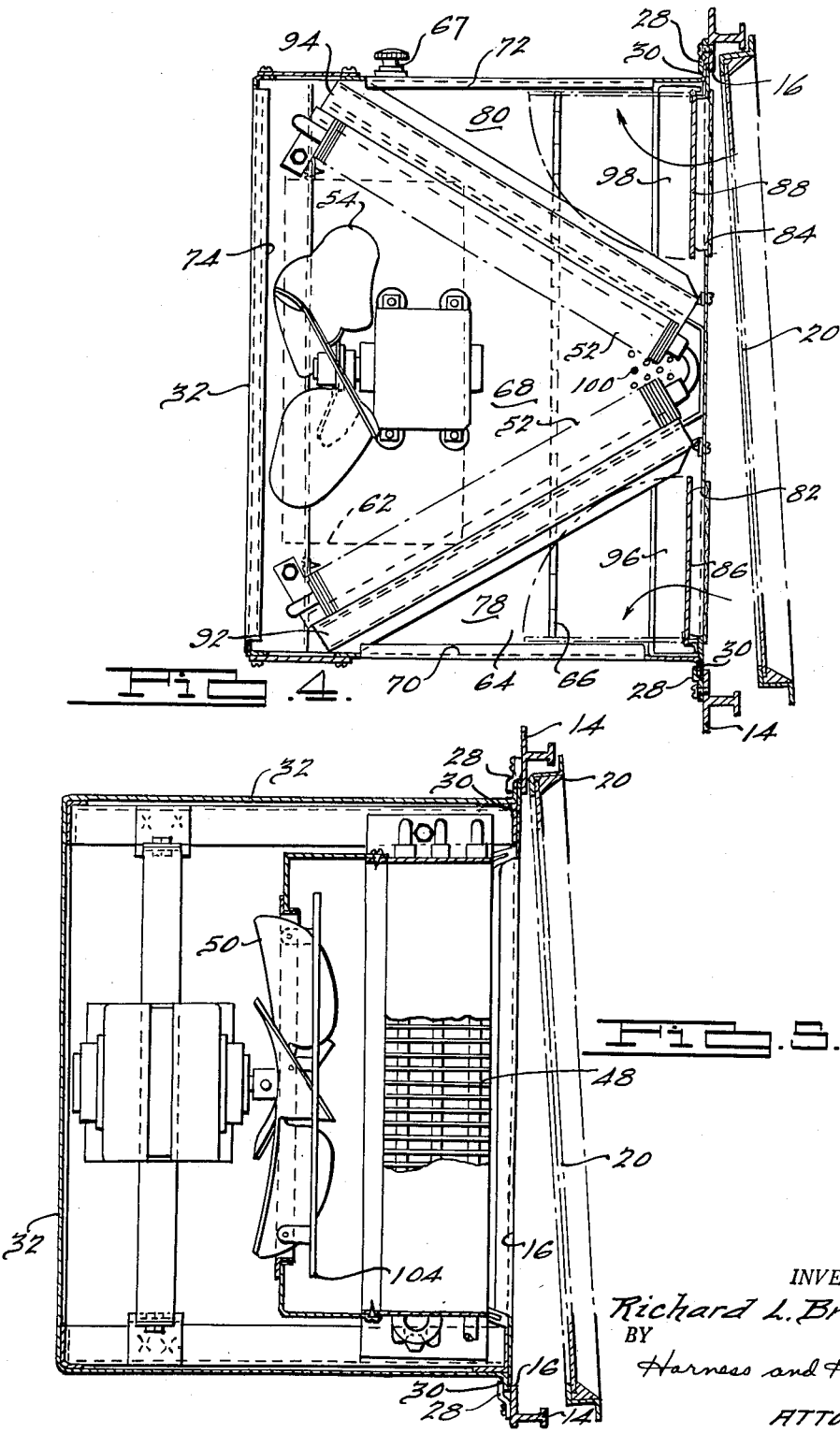

United States Patent Office 2,726,518
Patented Dec. 13, 1955

2,726,518

CASEMENT WINDOW MOUNTED AIR CONDITIONER

Richard L. Brugler, Trotwood, Ohio, assignor to Chrysler Corporation, Highland Park, Mich., a corporation of Delaware Application April 24, 1953, Serial No. 350,841

9 Claims. (Cl. 62—129)

This invention relates to an air conditioning unit of the air cooled type adapted for mounting in registry with the opening in a casement type window.

Window mounted room air conditioners of the type which dissipate heat through the window opening are well known and units of this type are generally mounted so that they lay across the window sill with a portion projecting outside of the building and a portion projecting into the room to be cooled. However, although such units may be rather easily installed in windows having vertically slidable sash sections they are generally unsatisfactory for association with the rather popular steel casement type of window. In the past it has been necessary to cut the steel casement in order to adapt the casement window opening to reception of a conventional window unit and it is a principal object of this invention to provide a window mounted air conditioner which is particularly adapted for fastening to the casement window frame in registry with the window opening without alteration of the casement window.

Nearly all commercially produced casement windows are provided with a standard size pair of outwardly swingable window sections which are hinged on vertical axes and each of which is one pane of glass wide and three panes of glass high. In installations where there is a larger window this is generally accomplished by the addition of fixed glass sections mounted around the periphery of the standard hinged window sections. My novel air conditioning unit is designed to be enclosed within a casing that approximates the shape of one hinged window section and it is provided with a laterally extending lip by means of which the usual fastening devices used for fastening screens on casement window sections may be used to hold the air conditioning unit in place.

It is an additional object of the invention to provide an air conditioning unit which extends wholly within the room and does not interfere with operation of the hinged window section so the latter may be closed when it is desirable to lock the window.

It is a further object of the invention to provide an air conditioning unit for casement windows which may be mounted on the window frame without altering the window frame and without requiring a supporting fixture or partitions to seal the window opening around the air conditioning unit. In fact the unit may be mounted such that the householder may optionally move the window unit from one room to another without requiring service from a dealer. Thus the expenses usually involved in initial installation and moving an air conditioning unit from one window to another are avoided.

It is an additional object of the invention to provide a window mounted air conditioner in which the component parts are arranged one above the other.

It is another object of the invention to provide an air conditioning unit in which fresh air may be admitted either in combination with refrigeration or without refrigeration and to assure that the fresh air thus admitted will be filtered.

It is also an object of the invention to provide an air conditioning unit for steel casement windows which is equipped to discharge air from the room to the outside.

In the drawings:

Fig. 4 is a sectional view taken on the line 4—4 of Fig. 3; and

Fig. 5 is a sectional view taken on the line 5—5 of Fig. 3.

Figures 1, 2:
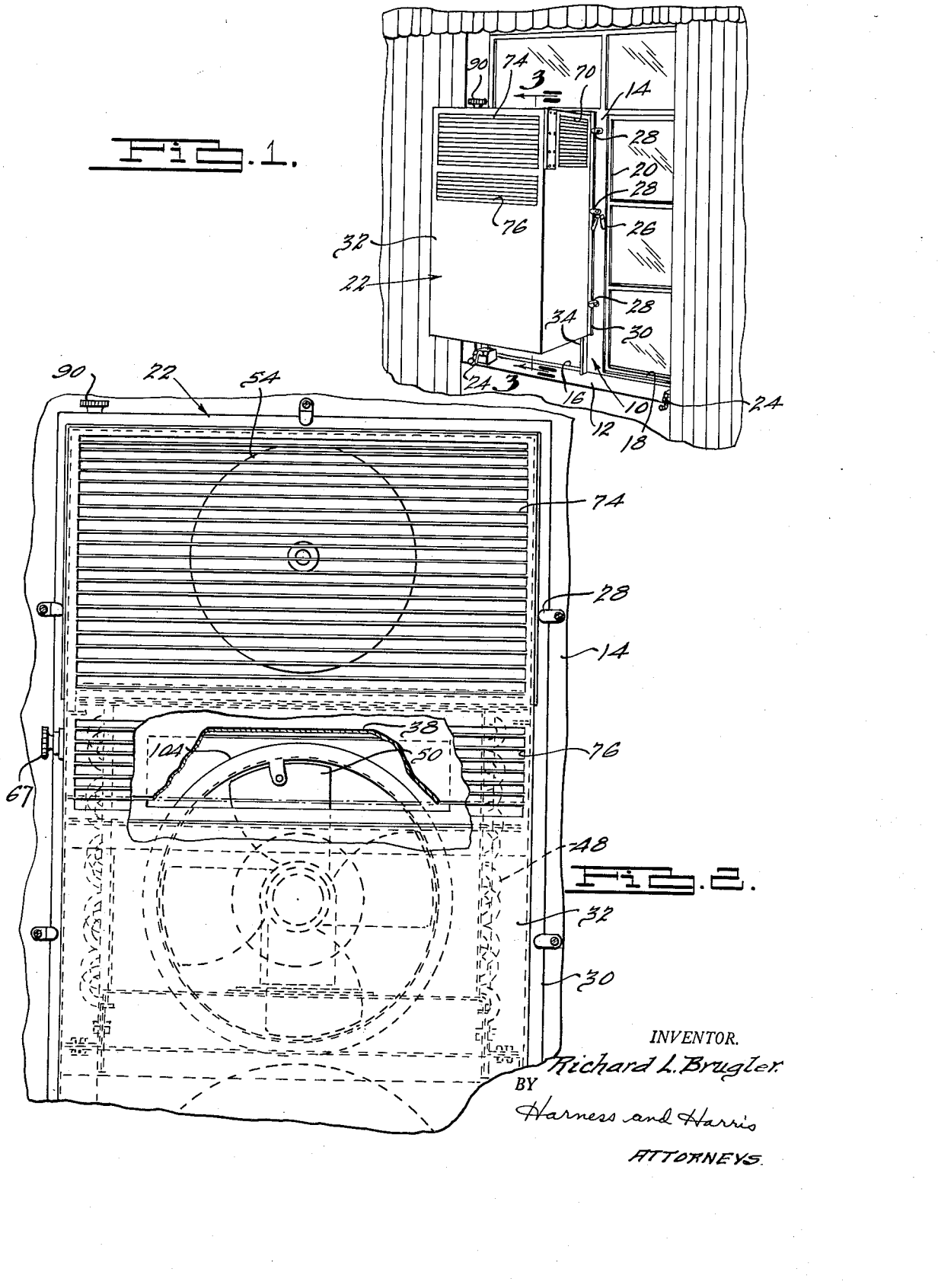
Fig. 1 is a perspective view of a casement window showing a unit embodying my invention mounted thereon.
Fig. 2 is a fragmentary front elevation with a portion of the casing broken away.

In Fig. 1 a casement window 10 having a window sill 12 is illustrated as provided with a frame 14 which defines window openings 16 and 18. The window frame 14 and sill 12 cooperate to define an L-shaped supporting structure having a vertical portion formed by the frame 14 and a horizontally extending portion formed by sill 12. Each of the window openings 16 and 18 is provided with a window section 20 which is pivotally mounted on a vertical axis for rotation from a closed to an open position. Each of the pivotally mounted window sections 20 are adapted to be rotated from a closed to an open position by operation of a handle or crank 24 and to be locked in the closed position by a conventional handle 26. In the particular showing of Fig. 1 the window section associated with the window opening 16 is obscured from vision by an air conditioning unit 22 to be described herein.

The window frame 14 presents an inner surface on which a plurality of lugs 28 are retained by screws. The lugs 28 which are in general commercial use are for the purpose of retaining a screen section over the window opening 16 and it will be noted that the air conditioner 22 is provided with laterally extending flanges or lips 30 which are adapted to be engaged by the lugs 28 to retain the air conditioner in its operative position.

Figure 3:
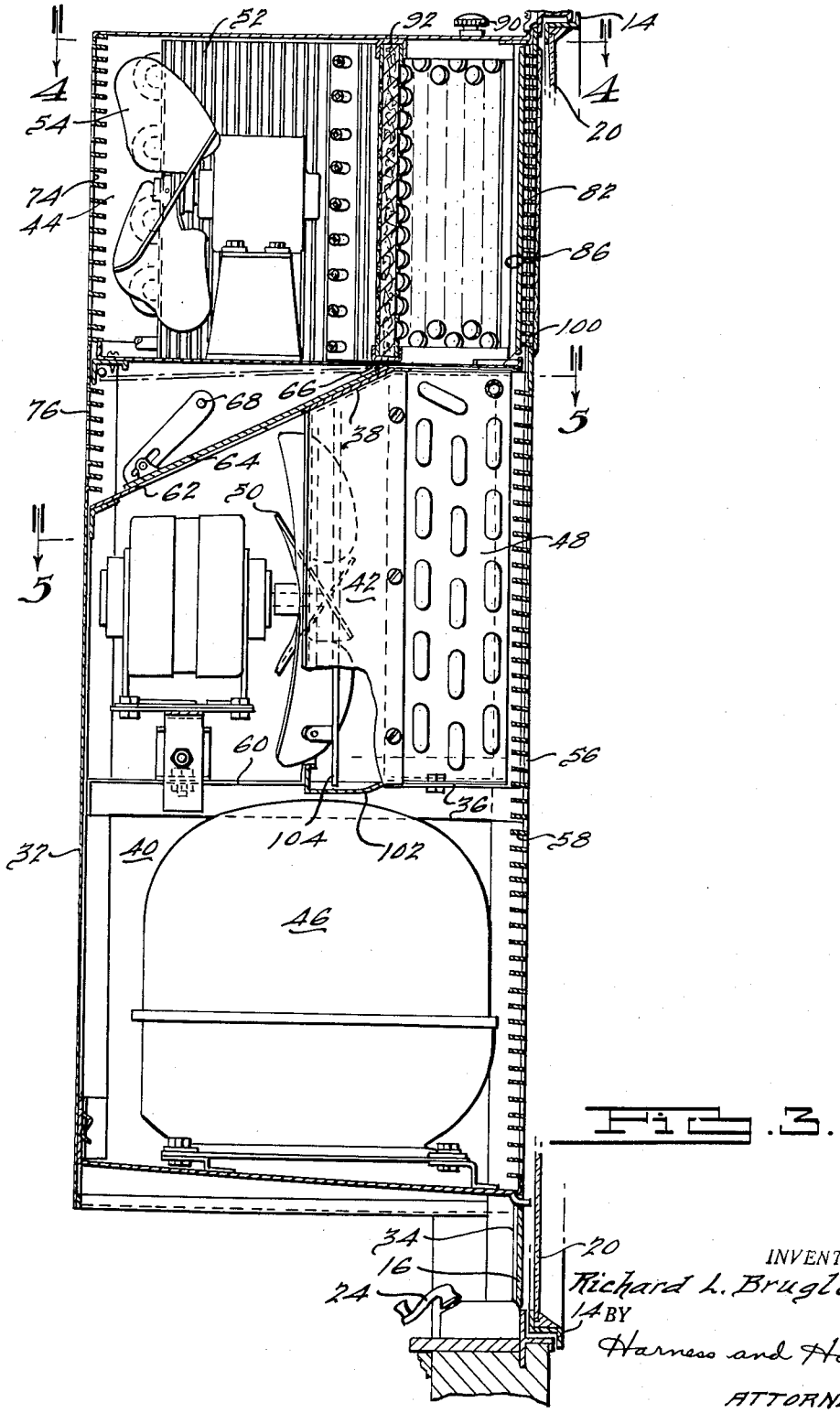
Fig. 3 is a vertical sectional view taken on the line 3—3 of Fig. 1.

It will be noted that the air conditioner comprises an enclosing and supporting structure including a box-like casing structure 32 to which the laterally extending lip 30 is attached and, in addition, that the box-like structure 32 has a depending supporting structural portion 34 which is adapted to rest upon the window sill 12 so that the inwardly extending portion of the casing 32 is spaced above the window regulating handle 24 so that the latter may be operated without obstruction from the casing 32. In addition, portion 34 serves as a closure for that portion of the window opening below the box-like casing structure 32. Referring to Figure 3 it will be noted that the depth of the box-like structure 32 is materially greater than the depth of the sill 12 and that the box-like structure extends as a cantilever projection beyond the sill 12.

Partitions 36 and 38 subdivide the casing 32 into a lower compartment 40, an intermediate compartment 42 and an upper compartment 44. An electrically driven motor compressor unit 46 is mounted in the lower compartment 40 while an air cooled condenser coil 48 and a motor driven fan 50 are mounted in the intermediate compartment 42. A V-shaped evaporator coil 52 is mounted in the upper compartment 44 and a motor driven fan 54 is also mounted in the upper compartment 54.

The casing side walls and partitions are provided with a plurality of openings which accommodate the flow of air through the air conditioning unit in certain desired paths. As illustrated in Figs. 3, 4 and 5 the unit is in registry with the window opening 16 and the back or outer wall 56 of the casing 32 is provided with a plurality of openings 58 which provide a fluid flow communication between the outside air and the compartment 40 and between the compartment 42 and outside air. The partition 36 which separates compartments 40 and 42 is also provided with an opening 60 so that operation of the fan 50 causes air from outside of the building to enter compartment 40 through the openings 58 so that this cool air may pass over the motor compressor unit 46 and may be drawn into compartment 42 for discharge through and cooling of the condenser coil 48.

The partition 38 which separates the condenser compartment 42 from the evaporator compartment 44 is provided with an opening 62 which is normally closed by a damper 64. The damper 64 is pivotally mounted at 66 and may be manually moved to a broken line position shown in Fig. 3 by manipulation of an operating handle 67 which is visible in Figs. 2 and 4. When the damper 64 is in the broken line position shown in Fig. 3 the opening 62 provides a fluid flow communication between the condenser compartment 42 and air being admitted to the evaporator compartment 44 in a manner to be described herein. The fan 50 is thus capable of drawing air from the room through the opening 62 for discharge to the outside to provide a function that is generally referred to as room pump out.

The evaporator compartment 44 is provided with a tray 68 which is of generally triangular shape and which extends under the evaporator coil 52 and under the motor of fan 54. The casing 32 is provided with inlet openings 70 and 72 in the side walls thereof for the admission of recirculated room air to the evaporator compartment 44. An opening 74 is similarly provided in the front wall of the casing 32 for the discharge of condition air to the room. In addition, the front wall of the casing 32 is provided with an auxiliary opening 76 for the admission of recirculated room air to the compartment 44. It is this opening 76 which provides recirculated room air for discharge through the opening 62 in partition 38 to accomplish room pump out when the damper 64 is in a position opening the opening 62 as described above. However, with the damper 64 closing opening 62 as illustrated in Fig. 3 fan 54 draws air from the room through the opening 76 in casing 32 and this air travels upwardly in the space provided above the partition 38 and damper 64. The air from opening 76 is prevented from rising directly into the forward portion of the evaporator compartment due to the presence of the tray 68. However, this air can rise in the triangular spaces 78 and 80 which are provided within the casing 32 and outwardly of the tray 68. The air is then drawn into the evaporator coil 52 by the fan 54 for cooling and is discharged from the opening 74 into the room.

A pair of openings 82 and 84 are provided in the rear wall of the casing 32 in fluid flow communication with the evaporator compartment 44 and dampers 86 and 88 are pivotally mounted on casing 32 for manipulation by a handle 90 which is positioned on top of casing 32. Suitable mechanical linkage, which is not illustrated, operatively connects the handle 90 with the dampers 86 and 88. When the dampers 86 and 88 are closed as illustrated in Fig. 4 the only air which is admitted to compartment 44 is recirculated room air. However, when the dampers are opened to the broken line positions illustrated in Fig. 4 fresh outside air is drawn into compartment 44 by fan 54 for cooling and mixture with the recirculated room air. It should be noted that dampers 86 and 88 in the broken line position have partially obstructed the openings 70 and 72 respectively thereby reducing the amount of recirculated room air admitted to compartment 44 for mixing with fresh outside air. The dampers 86 and 88 may of course be positioned in any intermediate position which provides a desirable quantity of fresh air.

A pair of filters 92 and 94 are mounted adjacent the evaporators 52 for filtering both recirculated room air and fresh air prior to passage through the evaporator coils.

A pair of extensions 96 and 98 are provided on the tray 68 so that they extend below the openings 82 and 84, respectively. The extensions 96 and 98 of tray 68 are intended to collect any rain water that might be driven through the openings 82 and 84.

Moisture which collects upon the evaporator 52 is collected by tray 68 which is tilted slightly towards the rear of the casing 32 and provided with a plurality of drain holes 100. The condensate drips through holes 100 and falls upon condenser coil 48 which, when in operation, is relatively warm and evaporation of the condensate and cooling of the condenser coil, which are both beneficial, occur. There is a tray 102 provided below the condenser coil for receiving unevaporated condensate which drips through the condenser coil. The fan 50 carries a slinger ring 104 which picks up moisture from pan 102 and throws it against the condenser coil 48 until evaporation of the moisture is completed. Moisture from the extensions 96 and 98 on the tray 68, of course, also drains into the openings 100 in the manner described above.

The entire air conditioning unit which has been described herein is adapted for mounting wholly within the room in abutting relationship with the frame of the casement window. This accommodates openings and closing of the pivotally mounted window section and requires no alteration of the casement window. The particular compartmentation and arrangement of the unit facilitates this mounting and the essential dissipation of the condenser heat through the window opening.

I claim:

1. An air conditioning device adapted to be installed in operative relation with a casement window in a room, said casement window having a window frame defining an opening and a section hinged on said frame for rotation outwardly about a vertical axis from a closed to an open position, said air conditioning device comprising a casing of substantial height relative to its width and adapted to be mounted wholly on the inside of said window frame with a back wall in registry with said window opening, said casing including partition means defining a lower, an intermediate and an upper superimposed compartment, a compressor mounted in the lowermost of said compartments, an air cooled condenser coil mounted in the intermediate compartment and extending across the back wall of the intermediate compartment, a V-shaped evaporator coil mounted in the upper of said three compartments with the apex of the coil in close proximity to the back wall, said compressor, condenser and evaporator being connected in refrigerant flow relationship, the back wall of said casing being provided with openings providing a fluid flow communication between the outside air and said lower compartment and between the outside and said intermediate compartment, said partition means having an opening providing a fluid flow communication between said lower and intermediate compartments, fan means mounted in said casing and adapted to induce a circulation of air from the outside, through said lower and intermediate compartments to the outside, said casing having openings providing inlet and outlet openings for said upper compartment in fluid flow communication with said room and fan means mounted in said upper compartment in the bight of the V-shaped coil and operable to induce a flow of room air over said evaporator and into said room.

2. An air conditioning device adapted to be installed in operative relation with a casement window in a room, said casement window having a sill and a window frame defining an opening and a window section hinged on said frame for rotation outwardly about a vertical axis from a position closing said opening to an open position, said casement window having an operating handle located adjacent said sill and operable to open and close said window section, said air conditioning device comprising a casing of substantial height relative to its width and adapted to be mounted wholly on the inside of said window frame with a back wall in registry with said window opening, said casing having a bottom wall adapted to be spaced vertically above said sill and having a leg portion adapted to support said casing upon said sill whereby free access to said operating handle is available when said air conditioning device is installed on said window frame and sill, said casing including partition means defining a lower compartment and an upper compartment superimposed thereon, a compressor and air cooled condenser mounted in the lower compartment, an evaporator coil mounted in the upper of said compartments, said compressor, condenser and evaporator being connected in refrigerant flow relationship, the back wall of said casing being provided with air intake and exhaust openings providing a fluid flow communication between the outside air and said lower compartment, means mounted in said casing to induce a circulation of air from the outside, through said lower compartment to the outside to dissipate heat from said compressor and condenser to the outside, said casing having openings providing inlet and outlet openings for said upper compartment in fluid flow communication with said room and means mounted in said upper compartment and operable to induce a flow of room air over said evaporator and into said room.

3. An air conditioning device for application to a room casement window having a vertically elongated rectangular window frame extending upwardly from a window sill to define a window opening and a window section for said opening pivotally mounted on said frame for rotation from a closed to an open position, said casement window being provided with a handle rotatably mounted on said frame adjacent said sill and operatively connected to said pivotally mounted window section for manual control of the opening and closing of said window section, said air conditioning device comprising an enclosing and supporting structure including a box-like structure provided with a rear wall shaped to fit in registry with and flush with said window opening with said box-like structure extending in to the room, said enclosing and supporting structure including a supporting structural portion which depends below said box-like structure to support said box-like structure in spaced relation to said window sill and to serve as a closure for that portion of the window opening below said box-like structure thereby to define a space below said box-like structure to permit access to said handle, means to secure said enclosing and supporting structure on said window frame, said box-like structure having room air intake and exhaust ports, an evaporator in said box-like structure in fluid flow communication with said room air intake and exhaust ports, means in said box-like structure to move room air through the intake and exhaust ports and over the evaporator, and means within said box-like structure to maintain said evaporator in a chilled condition, said last mentioned means including means to dissipate heat through said window opening to the outside atmosphere.

4. An air conditioning device for application to a room casement window having a vertically elongated window frame extending upwardly from a window sill to define a window opening and a window section for said opening pivotally mounted on said frame for rotation from a closed to an open position, said casement window being provided with a handle rotatably mounted on said frame adjacent said sill and operatively connected to said pivotally mounted window section for manual control of the opening and closing of said window section, said air conditioning device comprising an enclosing and supporting structure including a box-like structure provided with a rear wall shaped to fit in registry with and flush with said window opening with said box-like structure extending in to the room, said enclosing and supporting structure including an extended portion in the plane of said rear wall which depends below said box-like structure to support said box-like structure in spaced relation to said window sill and to serve as a closure for that portion of the window opening below said box-like structure thereby to define a space below said box-like structure to permit access to said handle, means to secure said enclosing and supporting structure on said window frame, said box-like structure having room air intake and exhaust ports, an evaporator in said box-like structure in fluid flow communication with said room air intake and exhaust ports, means in said box-like structure to move room air through the intake and exhaust ports and over the evaporator, and means within said box-like structure to maintain said evaporator in a chilled condition.

5. An air conditioning device for application to a room casement window having a vertically elongated window frame extending upwardly from a window sill to define a window opening and a window section for said opening pivotally mounted on said frame for rotation from a closed to an open position, said casement window being provided with a handle rotatably mounted on said frame adjacent said sill and operatively connected to said pivotally mounted window section for manual control of the opening and closing of said window section, said air conditioning device comprising and enclosing and supporting structure including a box-like structure provided with a rear wall shaped to fit in registry with and flush with said window opening with said box-like structure extending in to the room, said box-like structure having a base and a heighth sufficient to accommodate installation thereof with said base spaced above said sill, said enclosing and supporting structure including a supporting structural portion depending from said box-like structure and registering with the window opening below said box-like structure to support said box-like structure in spaced relation to said window sill and to serve as a closure for that portion of the window opening below said box-like structure, said supporting structure being shaped to provide a recess between said sill and said base to permit access to said handle, means to secure said enclosing and supporting structure on said window frame, said box-like structure having room air intake and exhaust ports, an evaporator in said box-like structure in fluid flow communication with said room air intake and exhaust ports, means in said box-like structure to move room air through the intake and exhaust ports and over the evaporator, and means within said box-like structure to maintain said evaporator in a chilled condition.

6. An air conditioning device for application to a room casement window having a vertically elongated rectangular window frame extending upwardly from a window sill to define a window opening and a window section for said opening pivotally mounted on said frame for rotation from a closed to an open position, said air conditioning device comprising an enclosing and supporting structure provided with a rear wall shaped to fit in registry with said window opening with said enclosing and supporting structure extending into the room, said enclosing and supporting structure including lips extending laterally from said enclosing and supporting structure adjacent said rear wall and adapted to abut said window frame to cooperate with fastening means carried by said window frame to secure said air conditioning device to said window frame, said box-like structure having room air intake and exhaust ports, an evaporator in said box-like structure in fluid flow communication with said room air intake and exhaust ports, means in said box-like structure to move room air through the intake and exhaust ports and over the evaporator, and means within said box-like structure to maintain said evaporator in a chilled condition.

7. An air conditioning cabinet for support by a substantially L-shaped supporting structure having a substantially vertical portion and a substantially horizontal portion; said cabinet comprising a box-like structure which has greater heighth than width, said box-like structure having a rear wall adapted to abut said vertical portion of said supporting structure, side walls, a top wall, a front wall and a bottom wall, first support means extending between said bottom wall and said horizontal portion of said supporting structure to support said box-like structure in spaced relation to the horizontal portion of said supporting structure, said first support means being located in closer proximity to said rear wall than said front wall, and second support means in addition to said first support means, said second support means being carried by said box-like structure at locations above said bottom wall and operable for securement to said vertical portion of said L-shaped supporting structure to prevent said box-like structure from falling forwardly.

8. An air conditioning cabinet for support by a substantially L-shaped supporting structure having a substantially vertical portion and a substantially horizontal portion; said cabinet comprising a box-like structure which has greater heighth than width, said box-like structure having a rear wall adapted to abut said vertical portion of said supporting structure, side walls, a top wall, a front wall and a bottom wall, said bottom wall having a depth from front to rear of said box-like structure that is appreciably greater than the distance which said horizontal portion of said supporting structure extends forwardly of said vertical portion thereof, first support means extending between said bottom wall and said horizontal portion of said supporting structure to support said box-like structure in spaced relation to the horizontal portion of said supporting structure, said box-like structure having means adapted to receive a fastening device for securement to the vertical portion of said L-shaped supporting structure to prevent said box-like structure from falling forwardly.

9. An air conditioning cabinet for support by a substantially L-shaped supporting structure having a substantially vertical portion and a substantially horizontal portion; said cabinet comprising a box-like structure which has greater heighth than width, said box-like structure having a rear wall adapted to be positioned in substantially flush relationship with respect to said vertical portion of said L-shaped supporting structure, said box-like structure also being provided with side walls, a top wall, a front wall and a bottom wall, first support means extending between said bottom wall and said horizontal portion of said supporting structure to support said box-like structure in spaced relation to the horizontal portion of said supporting structure, said box-like structure having a depth of sufficient magnitude so that the bottom of said box-like structure extends as a cantilever projection beyond said horizontal portion of said L-shaped supporting structure, and said box-like structure having means adapted to receive a fastening device for securement to the vertical portion of said L-shaped supporting structure to prevent said box-like structure from falling forwardly.

References Cited in the file of this patent

UNITED STATES PATENTS

| | | |
|---|---|---|
| 2,047,169 | Weiland | July 7, 1936 |
| 2,232,459 | Hull | Feb. 18, 1941 |
| 2,317,104 | Moore | Apr. 20, 1943 |
| 2,359,051 | Roper | Sept. 26, 1944 |
| 2,519,086 | Eberhart | Aug. 15, 1950 |
| 2,560,467 | Moore | July 10, 1951 |
| 2,612,098 | Bolin | Sept. 30, 1952 |
| 2,620,638 | Grandinetti | Dec. 9, 1952 |
| 2,654,233 | Shoemaker | Oct. 6, 1953 |